UNITED STATES PATENT OFFICE.

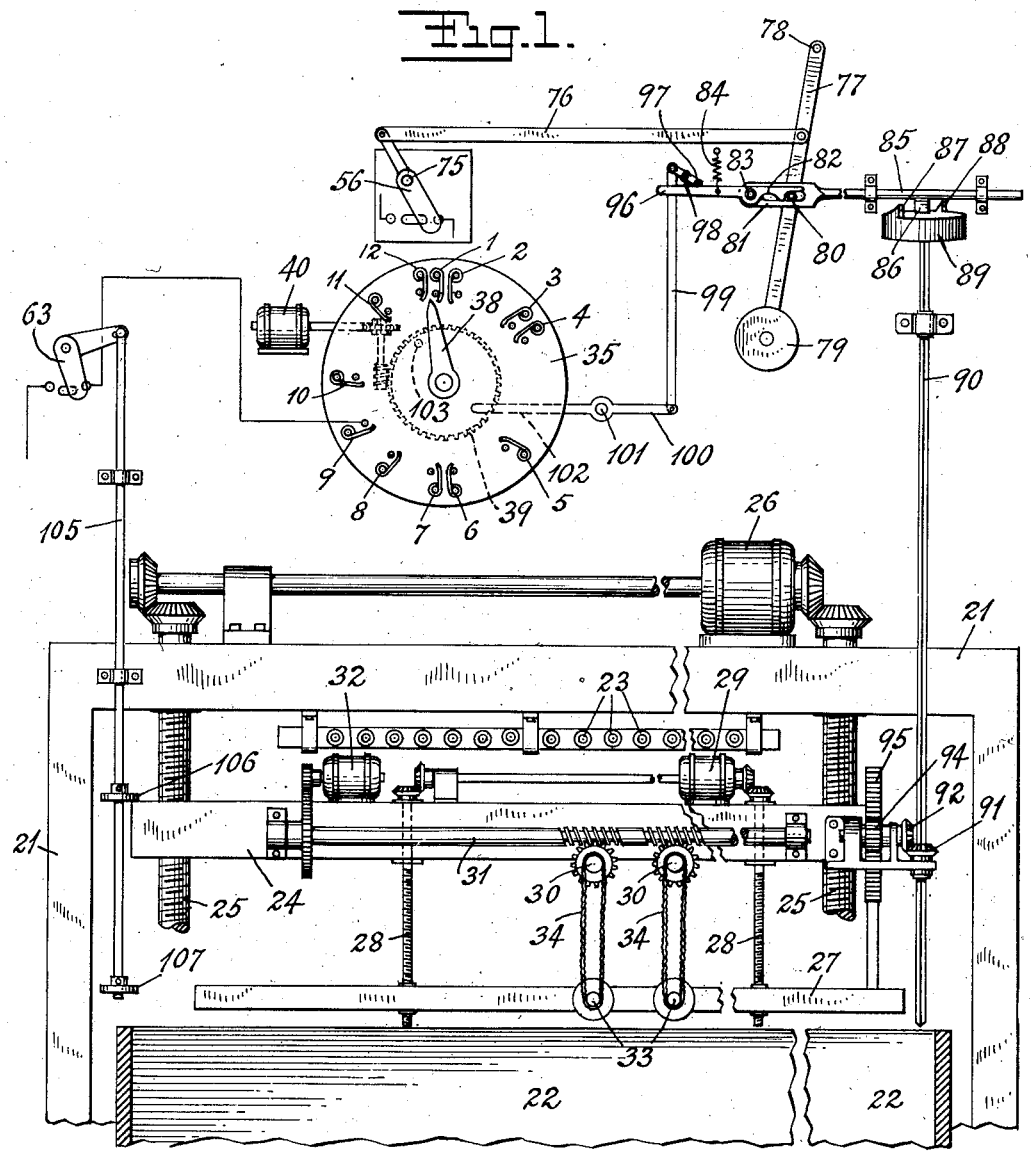

JAMES EDWARD WILD AND WILLIAM WALLACE CALDWELL, OF FALL RIVER, MASSACHUSETTS, ASSIGNORS TO THE AMERICAN THREAD COMPANY, OF JERSEY CITY, NEW JERSEY, A CORPORATION OF NEW JERSEY.

MEANS FOR ELECTRICALLY CONTROLLING SKEIN-MERCERIZING MACHINES.

1,343,804.        Specification of Letters Patent.    Patented June 15, 1920.

Application filed October 17, 1918. Serial No. 258,594.

*To all whom it may concern:*

Be it known that we, JAMES E. WILD, a subject of Great Britain, and WILLIAM W. CALDWELL, a citizen of the United States, residing at Fall River, county of Bristol, State of Massachusetts, have invented a certain new and useful Improvement in Means for Electrically Controlling Skein-Mercerizing Machines, of which the following is a full, clear, and exact description.

Our invention relates to means for electrically controlling skein mercerizing machines of the Smith, Drum & Co. type, and has for its object to provide means for automatically causing said machines to function so as to carry out the mechanical portions of the mercerizing process in the proper order and for the proper periods to produce the desired result of mercerizing cotton yarns in the skein.

The following is a description of an embodiment of our invention, reference being had to the accompanying drawings, in which, Figure 1 represents parts of a mercerizing machine of the type mentioned, having our automatic control applied thereto;

Fig. 2 shows the circuit controlling mechanism together with motors and relays controlled thereby, and the circuit connections between the same;

Figs. 3 and 4 are details of certain circuit controlling contacts; and

Fig. 5 shows one of the relays in closed position.

Referring more particularly to the drawings, 21 is the frame of the mercerizing machine. 22 is the tank containing the caustic solution with which the yarn is to be treated. 23 are the spray pipes through which water is supplied for washing the yarn. 24 is the upper member of the cage which cage is raised and lowered by screws 25 engaging member 24 and actuated by the motor 26 through suitable gearing. 27 is the lower member of the cage, which may be moved upward and downward relatively to the upper member 24 by screws 28 operated by the motor 29. 30 are laterally extending revoluble poles carried by the upper member 24 and revolved by worm gearing through a shaft 31 actuated by the motor 32, the motors 29 and 32 being carried by the member 24. 33 are revoluble poles carried by the lower member 27, and 34 are skeins of yarn placed over the poles 30 and 33 respectively, so as to be carried thereby. 35 is a circuit-controlling device having a series of movable circuit controller contacts 1 to 12 coöperating with stationary contacts, some of which are normally open as shown in full lines at 2, 2' in Fig. 3 and others of which are normally closed as shown in full lines at 1, 1' in Fig. 4. These contacts are carried by a disk of insulating material, in which is mounted a revoluble pointer 38 connected to a gear 39 (Fig. 1) driven clockwise by a motor 40 through suitable worm gearing. The motors 29, 32, 26 are controlled by relays shown in Fig. 2, the relays themselves being controlled, as hereafter described, through the circuit controllers 1 to 12 as they are engaged by the pointer 38 in the course of its travel. In Fig. 1 the pointer 38 is shown as approaching its stopping point. In Fig. 2 the pointer 38 is shown in engagement with the movable contact maker 1, having moved it out of engagement with its coöperating contact so as to open the circuit through the driving motor 40, this circuit being a single-phase circuit derived from two of the mains of a three-phase system. The opening of this circuit by the pointer 38 in this manner stops the motor 40 when the pointer 38 has completed a revolution. The opening of this circuit is also indicated by the pilot lamp 51 which is cut out of circuit simultaneously with the motor 40. 52 is a push button switch. Pressure upon the push button closes the circuit through the motor 40, whereupon the pointer 38 begins to rotate and continues to rotate until it has again moved the contact 1 so as to again open the circuit of motor 40. After leaving the contact 1, the pointer engages a contact 2, closing the circuit through a relay 53. This relay actuates to throw a two-pole switch 54, connecting the motor 29 in circuit so as to cause it to revolve the screws 28 and stretch the skeins 34 upon the poles 30—33. The relay 53 also actuates a circuit-maker 55, which holds the circuit of the relay 53 closed so long as it is energized. 56 is a limit switch, which, when the motor has run as long as is desired, opens the circuit through the relay 53 and circuit-maker 55 so as to stop its motor, as hereinafter described in detail. This action results in the preliminary stretching of the yarn.

When the pointer 38 reaches the movable contact 3, it causes it to make engagement with its coöperating member and closes the circuit through the relay 57 so as to actuate the switch 58, connecting the motor 32 in circuit and thereby rotating the shaft 31 and the poles 30 and 33. The relay 57 also closes a circuit-maker 59 so that the relay 57 remains energized and its switch closed after the pointer has left the contact member 3. As the pointer reaches the contact 4 and moves the same so as to close its circuit, it closes a circuit through the relay 60, actuating the switch 61 and closing the circuit through the motor 26 so as to lower the cage with its yarn into the tank 22. This switch also has a circuit closer 62 which maintains the circuit through the relay 60 closed after the pointer has left the contact 4 and keeps it closed until it is opened by the limit switch 63, which takes place when the cage is fully lowered into the tank, as further described below.

When the pointer 38 actuates the contact 5, it closes a circuit through the relay 64, actuating the switch 65 so as to connect the motor 26 to the mains in such a way as to rotate it in the opposite direction, thereby raising the cage after the yarn has been in the bath for the desired interval. This switch also has a circuit closer 66 which keeps the relay 64 energized until its circuit is opened by the limit switch 63. The contact 6 is normally in closed position and when it is actuated by the pointer 38 operates to open the circuit through the relay 57 and thereby stops the pole rotating motor 32. When the pointer engages the contact 7, it closes its circuit and energizes the relay 67 so as to actuate the switch 68 and connect the pole rotating motor 32 to the mains in such a way as to rotate it in the opposite direction, the circuit through the relay 67 being maintained closed through the circuit-maker 69. When the pointer actuates the contact-maker 8 it closes a circuit through the bell 70 supplied with current to a transformer 71, which is a signal to the attendant to supply warm water to the spray pipes 23 to wash the yarn.

When the pointer actuates the contact member 9, it closes a circuit through the relay 53, which then acts to operate the motor 29 a second time to give the skein a second stretch.

When the pointer operates the contact member 10, it closes the circuit through the bell 70 for the second time, this being the signal for the attendant to supply cold water to the spray pipes 23 for a given period to wash the yarn.

When the pointer actuates the contact member 11, it closes the circuit through the relay 72, which actuates the switch 73, connecting the motor 29 to the mains so as to revolve in the opposite direction and thus draw the poles 30 and 33 together for the purpose of releasing the yarn, at the same time closing the circuit through the relay magnet by the contact maker 74, which holds it closed until it is broken by the limit switch 56, whereupon the motor 29 stops.

When the pointer reaches the contact member 12, it opens the circuit through the relay 67 and member 69, deënergizing the relay and thereby opening the switch 68 and causing the pole revolving motor 32 to stop. The pointer then moves the contact 1 from its normally closed position so as to stop motor 40, which with the pointer 38 remains at rest until the push button 52 is again actuated.

The limit switch 56, when the cycle starts, is in the position shown in Fig. 1, being adapted to turn on its axis 75 so as to break circuit between the contacts with which it is there shown in engagement and make engagement with the other contacts, which may be called the reversing contacts. The switch 56 is connected by a link 76 to a lever 77 supported at 78 and terminating in a weight 79. This lever is provided with a pin 80 which passes through a slot in a yoke 81, which yoke carries a detent 82 pivoted to the yoke at 83 and moved toward the pin 80 by the spring 84. The yoke 81 is provided with an extension 85 having a projection 86 lying in the path of two lugs 87 and 88 located on diametrically opposite sides of the center of a disk 89 carried by a shaft 90. This shaft 90 is square and is provided with a beveled gear 91, slidably mounted thereon but turning therewith, which is engaged by a beveled gear 92 mounted in a bearing 93 carried by the member 24 and connected to a gear 94 in engagement with a rack 95 secured to the lower frame member 27, so that as the frame 27 moves upward and downward relatively to member 24 the disk 89 with its lugs 87 and 88 is rotated in one direction or the other for a corresponding amount. These features, including the switch 56 and the parts 76 to 95 are old in connection with hand-controlled mercerizing machines, and in order to carry out my invention I have provided the detent 82 with an elongated extension 96, which is engaged by a lever 97 adapted to turn around the point 98 and connected to the link 99, which in turn is pivoted to a lever 100 fulcrumed at 101 and having an arm 102 adapted to be engaged by a pin 103 carried by the gear 39. By this means it is possible to control the switch 56 automatically so as to produce a double stretch in the yarn 34 upon the poles 30—33. This double stretch action occurs as follows: When the movable contact 2 is brought in connection with its corresponding stationary contact the motor 29 is started and after such engagement ceases, continues to operate by reason of the fact that its circuit remains closed through the action of the relay magnet 53. When the yarn has been given a sufficient first stretch the rack 95, through the gearing described, turns the shaft 90, so as to cause the lug 87 to engage the projection 86, and moves the detent 82 to the right at the same time moving the weight 79 and throwing the switch 56 from the position shown in Fig. 1 to the position in which it will open the circuit through the magnet 53 and cause the motor 29 to stop and then engage the other or reversing contacts. No reversal of the motor at this time takes place, however, since the circuit through the motor is open at another point. After this switch 56 is thus opened the pin 103 engages the extension 102 of the lever 100 and through it and the lever 97 causes the detent 82 to disengage the pin 80, permitting the weight 79 to swing over to the position shown in Fig. 1 and again throw the switch 56 to the position shown in Fig. 1. The motor 29, however, does not thereupon start since its circuit is open at the contacts 1 and 9. When, however, the contact 9 is engaged by the pointer 38 the circuit through the motor 29 is closed and the motor operates a second time to produce a second stretch and continues to operate until the lug 87 has again, by its action upon the projection 86 and yoke 81, thrown the switch 56 so as to again open the circuit through the magnet 53 whereupon the circuit through the motor 29 opens and the motor stops. The parts remain in this position until the pointer 38 engages the contact 11 and closes the circuit therethrough, whereupon the motor 29 becomes energized so as to rotate in the reverse direction and continues to rotate so as to release the stretch until the member 27 of the frame has risen sufficiently to revolve the shaft 90 in the opposite direction and bring the lug 88 into engagement with the projection 86, thrusting the yoke 81 to the left until the right-hand end of the slot in the yoke 81 engages the pin 80 and then moves the weight 79 until it assumes the positions shown in Fig. 1 and the switch 56 has been moved to the position shown in that figure. This opens the circuit through the magnet 72 and circuit of motor 29 and stops the same with the switch 56 and the weight 79 in the position shown, ready for the beginning of a new cycle.

The limit switch 63 which controls the raising and lowering motor 26 is actuated by a rod 105 provided with stops 106 and 107, which are engaged by the frame member 24. The switch 63 in Fig. 1 is shown in its position for the moving of the motor 26 to lower the frame member 24 when the contact 4 is engaged by the pointer 38. When such engagement takes place the circuit is completed through the motor 26 and the same continues to operate until the member 24 engages the stop 107 and moves the rod 105 so as to throw the switch 63 from the position shown in the drawings to the reverse position, whereupon the motor 26 stops, the switch 63 being now in engagement with the reverse contacts. When the pointer 38 reaches the contact 5 so as to close the circuit therethrough, the circuit through the motor 26 is closed so as to cause that motor 26 to rotate in the opposite direction, the limit switch 63 being in position to hold this reversing circuit closed until the member 24 engages the stop 106 so as to throw the switch 63 to the position shown in the drawings whereupon the motor 26 stops and the parts are in position for a second lowering cycle. The switches 56 and 63 are preferably snap switches of any suitable type.

The machine with its described controlling means automatically performs the desired steps in the desired order after being started by pressing the button 52, the proper contacts 1 to 12 inclusive being so spaced as to start the motors at the proper times, their distances being proportionate to the desired intervals and the limit switches 56 and 63 stopping their motors at the proper times and the motor 32 being stopped by the contacts 6 and 12, thus producing a cycle of action which is entirely automatic except for the supply of the warm and cold water, which is turned on and off by the attendant upon the signal due to the contacts 8 and 10. The period for mercerizing, including stretching and washing, takes about sixteen minutes and the pointer 38 is made to make one revolution in that time.

As will be evident to those skilled in the art, our invention permits of various modifications without departing from the spirit thereof or the scope of the appended claims.

What we claim is:

1. In an electrically operated skein mercerizing machine, a normally open circuit-maker, a normally closed circuit-maker, a relay in series with the normally open circuit-maker, an auxiliary switch controlled by said relay for maintaining its circuit when closed, said auxiliary switch being in series with said normally closed circuit-maker and in parallel with said normally open circuit-maker, and a traveling actuator adapted to close said open circuit-maker and subsequently open said closed circuit-maker, and a motor circuit controlled by said relay, and rotatable poles driven by said motor and adapted to support the yarn to be mercerized.

2. In an electrically operated skein mercerizing machine, the combination of two motors, two relays for each of said motors, a plurality of normally open circuit-makers one for each relay, said circuit-makers being arranged in the order in which it is desired to operate said relays for controlling said motors and spaced apart by distances proportionate to the desired intervals, a rotatable member for closing said circuit-makers successively, means for opening the circuits through said relays, and means for rotating said member, and immersing and stretching mechanisms actuated by said motors respectively.

3. In an electrically operated skein mercerizing machine, the combination of three motors, two relays for each motor for causing it to run in opposite directions, a plurality of normally open circuit-makers one for each relay, said circuit-makers being arranged in the order in which it is desired to operate said relays for controlling said motors and spaced apart by distances proportionate to the desired intervals, a rotatable member for closing said circuit-makers successively, means for rotating said member, and additional normally closed circuit-makers in series with the circuits of some of said relays respectively, and adapted to be opened by said rotating member at desired intervals for stopping one of said motors, pole rotating mechanism actuated by said last-named motor, and stretching and immersing mechanisms actuated by the other two motors respectively.

4. In an electrically operated skein mercerizing machine, the combination of three motors, two relays for each motor for causing it to run in opposite directions, a plurality of normally open circuit-makers, one for each relay, said circuit-makers being arranged in the order in which it is desired to operate said relays for controlling said motors and spaced apart by distances proportionate to the desired intervals, a rotatable member for closing said circuit-makers successively, a driving motor for rotating said member, and a normally closed circuit-maker for said driving motor adapted to be opened by said rotating member substantially at the completion of each revolution, and immersing and stretching mechanisms and rotatable poles actuated by said three first mentioned motors respectively.

5. In an electrically operated skein mercerizing machine, the combination of a motor, two relays for controlling the same for causing it to rotate in opposite directions, two pairs of normally open contacts for controlling said relays respectively, two pairs of normally closed contacts, one of said relays and one of said normally closed contacts being in multiple with each of said normally open contacts and in series with one another, the normally open contacts being mounted so as to alternate with the normally closed contacts, and progressively acting means to close the open contacts and open the closed contacts, and rotatable poles driven by said motor.

6. In an electrically operated skein mercerizing machine, the combination of a motor, two relays for connecting said motor for operation in opposite directions, two normally open contacts in multiple with one of said relays, a normally open contact for said other relay, and progressive actuating means for closing said contacts successively, and a limit switch for controlling the motor circuit, and yarn stretching poles driven by said motor.

7. In an electrically operated skein mercerizing machine, the combination of a cage having separable poles for holding skeins to be treated, a motor for moving said poles so as to vary the distance between them, an actuating device, contacts controlled thereby for closing the circuit through said motor to separate said poles, a limit switch, means controlled by said motor for actuating said limit switch to stop said motor, means upon said actuating device for automatically re-setting said limit switch in its original position, contacts controlled by said actuating device for re-starting said motor in the same direction to further separate said poles, said means for actuating said limit switch being adapted to be actuated by said motor to stop it after it has completed the further separation of said poles, contacts controlled by said actuating device for reversing the movement of said motor, and means for thereafter again re-setting said limit switch in original position.

8. In an electrically operated skein mercerizing machine, the combination of a cage having separable rotatable poles, a motor for lowering and raising said cage, a motor for rotating said poles, a motor for causing said poles to separate and approach, a rotatable contact actuating member, a motor for rotating said actuating member, normally separated contacts for causing the first motor to separate said poles, normally separated contacts for causing the second motor to rotate said poles in one direction, normally separated contacts for causing the third motor to lower said cage, normally separated contacts for causing said third motor to raise said cage, normally connected contacts for causing said second motor to stop, normally separated contacts for causing said second motor to reverse, normally separated contacts for causing said first motor to further separate said poles, normally separated contacts for causing said first motor to move said poles toward one another, normally connected contacts for stopping said second motor, all of said contacts being changed from their respective normal condition in the order named by said actuating device as it revolves, the normally separated contacts being temporarily connected and the normally connected contacts being temporarily separated by the action of said device.

9. In an electrically operated skein mercerizing machine, the combination of a cage having separable rotatable poles, a motor for lowering and raising said cage, a motor for rotating said poles, a motor for causing said poles to separate and approach, a rotatable contact actuating member, signaling means, a motor for rotating said actuating member, normally separated contacts for causing the first motor to separate said poles, normally separated contacts for causing the second motor to rotate said poles in one direction, normally separated contacts for causing the third motor to lower said cage, normally separated contacts for causing said third motor to raise said cage, normally connected contacts for causing said second motor to stop, normally separated contacts for causing said second motor to reverse, normally separated contacts for actuating said signaling means, normally separated contacts for causing said first motor to further separate said poles, normally separated contacts for actuating said signaling means, normally separated contacts for causing said first motor to move said poles toward one another, normally connected contacts for stopping said second motor, all of said contacts being changed from their respective normal condition in the order named by said actuating device as it revolves, the normally separated contacts being temporarily connected and the normally connected contacts being temporarily separated by the action of said device.

10. In an electrically operated skein mercerizing machine, the combination of a cage having separable rotatable poles, a motor for lowering and raising said cage, a motor for rotating said poles, a motor for causing said poles to separate and approach, a rotatable contact actuating member, a motor for rotating said actuating member, normally closed contacts for stopping said fourth motor, normally open contacts for causing the first motor to separate said poles, normally open contacts for causing said second motor to rotate said poles in one direction, normally separated contacts for causing the third motor to lower said cage, normally separated contacts for causing said third motor to raise said cage, normally connected contacts for causing said second motor to stop, normally separated contacts for causing said second motor to reverse, normally separated contacts for causing said first motor to further separate said poles, normally separated contacts for causing said first motor to move said poles toward one another, normally connected contacts for stopping said second motor, all of said contacts being changed from their respective normal condition in the order named by said actuating device as it revolves, the normally separated contacts being temporarily connected and the normally connected contacts being temporarily separated by the action of said device.

JAMES EDWARD WILD.
WILLIAM WALLACE CALDWELL.